(12) United States Patent  
Takano (10) Patent No.: US 9,942,478 B2  
(45) Date of Patent: Apr. 10, 2018

(54) IMAGE STABILIZATION APPARATUS AND IMAGE PICKUP APPARATUS APPLIED WITH IMAGE STABILIZATION APPARATUS

(71) Applicant: OLYMPUS CORPORATION, Hachioji-shi, Tokyo (JP)

(72) Inventor: Hisanori Takano, Musashino (JP)

(73) Assignee: OLYMPUS CORPORATION, Tokyo (JP)

( * ) Notice: Subject to any disclaimer, the term of this patent is extended or adjusted under 35 U.S.C. 154(b) by 14 days.

(21) Appl. No.: 15/292,071

(22) Filed: Oct. 12, 2016

(65) Prior Publication Data

US 2017/0150056 A1    May 25, 2017

(30) Foreign Application Priority Data

Nov. 20, 2015    (JP) .................................. 2015-227683

(51) Int. Cl.
*H04N 5/232*    (2006.01)

(52) U.S. Cl.
CPC ............................... *H04N 5/23287* (2013.01)

(58) Field of Classification Search
CPC ............... G03B 2205/0007–2205/0038; G03B 2207/005; G06T 7/38; H04N 5/23287
See application file for complete search history.

(56) References Cited

U.S. PATENT DOCUMENTS

| 7,983,545 | B2 | 7/2011 | Maeda et al. |
| 8,908,272 | B2 | 12/2014 | Ezawa |
| 2009/0128928 | A1* | 5/2009 | Ito .......................... G02B 7/023 359/814 |
| 2011/0044672 | A1* | 2/2011 | Ito .......................... G02B 7/023 396/55 |

FOREIGN PATENT DOCUMENTS

| JP | 2010026399 A | 2/2010 |
| JP | 2012032543 A | 2/2012 |

* cited by examiner

*Primary Examiner* — Mekonnen Dagnew  
(74) *Attorney, Agent, or Firm* — Holtz, Holtz & Volek PC

(57) ABSTRACT

An image stabilization apparatus includes a moving member configured to be movable within a plane orthogonal to an optical axis of an image pickup optical system, a stationary member configured to movably support the moving member within the plane orthogonal to the optical axis of the image pickup optical system, and a plurality of drive units configured to drive the moving member so as to move within the plane orthogonal to the optical axis of the image pickup optical system with respect to the stationary member, in which a first drive unit of the plurality of drive units is arranged on a first surface side of the moving member and a second drive unit of the plurality of drive units is arranged on a second surface side of the moving member.

10 Claims, 6 Drawing Sheets

FIG. 6

IMAGE STABILIZATION APPARATUS AND IMAGE PICKUP APPARATUS APPLIED WITH IMAGE STABILIZATION APPARATUS

CROSS REFERENCE TO RELATED APPLICATION

This application claims the benefit of Japanese Application No. 2015-227683 filed in Japan on Nov. 20, 2015, the contents of which are incorporated herein by this reference.

BACKGROUND OF THE INVENTION

1. Field of the Invention

The present invention relates to an image stabilization apparatus provided with a mechanism configured to correct image blur of an optical image formed by an image pickup optical system and an image pickup apparatus to which the image stabilization apparatus is applied.

2. Description of the Related Art

Conventionally, image pickup apparatuses are generally commercialized which are configured to sequentially photoelectrically convert an optical image formed by an image pickup optical system using an image pickup device or the like, store the image signal thereby acquired in a storage medium as image data (still image) or video data (movie) in a predetermined mode or transmit the acquired image signal to image display apparatus so as to be able to sequentially displayed.

As such type of image pickup apparatuses, conventionally, various types of image pickup apparatuses provided with an image stabilization apparatus configured so as to be able to correct so-called image blur caused by shake (e.g., so-called hand shake) of an image pickup apparatus or the like in which image pickup operation is in progress are disclosed and commercialized in Japanese Patent Application Laid-Open Publication No. 2010-26399 and Japanese Patent Application Laid-Open Publication No. 2012-32543 or the like.

The image stabilization apparatus disclosed in above Japanese Patent Application Laid-Open Publication No. 2010-26399 or the like adopts a configuration in which a support member configured to movably support a moving member that holds an optical system which is part of an image pickup optical system and drive means for moving the moving member are arranged in a region biased in one diameter direction centered on an optical axis of the image pickup optical system. Note that Japanese Patent Application Laid-Open Publication No. 2010-26399 discloses a so-called lens shift type image stabilization apparatus in a mode in which image stabilization is performed by moving the optical lens which is part of the image pickup optical system within a plane orthogonal to the optical axis of the image pickup optical system.

The image stabilization apparatus disclosed in above Japanese Patent Application Laid-Open Publication No. 2012-32543 or the like is configured to arrange components of drive means (coil, magnet, yoke) for driving the moving member with respect to the stationary member and part of a flexible printed circuit board that extends from the drive means in a space between the moving member and the stationary member. In this case, the above drive means are configured to be provided at respective positions of the image pickup device and the image pickup optical system opposite to each other across the optical axis. Note that above Japanese Patent Application Laid-Open Publication No. 2012-32543 discloses the so-called sensor shift type image stabilization apparatus in the mode in which image stabilization is performed by moving the image pickup plane of the image pickup device within the plane orthogonal to the optical axis.

SUMMARY OF THE INVENTION

An image stabilization apparatus according to an aspect of the present invention includes a moving member configured to be movable within a plane orthogonal to an optical axis of an image pickup optical system, a stationary member configured to movably support the moving member within the plane orthogonal to the optical axis of the image pickup optical system, and a plurality of drive means configured to drive the moving member so as to move within the plane orthogonal to the optical axis of the image pickup optical system with respect to the stationary member, in which first drive means of the plurality of drive means is arranged on a first surface side of the moving member and second drive means of the plurality of drive means is arranged on a second surface side of the moving member.

An image pickup apparatus according to an aspect of the present invention includes a lens drive mechanism including an image pickup device configured to photoelectrically convert an optical image to an image signal, an image pickup optical system including a plurality of optical lenses, a plurality of lens holding barrels configured to respectively hold the plurality of optical lenses constituting the image pickup optical system, a lens drive shaft configured to movably support part of the plurality of lens holding barrels in a direction along an optical axis of the image pickup optical system and a drive source configured to drive the lens drive shaft; and an image stabilization apparatus including a moving member configured to be movable within a plane orthogonal to the optical axis of the image pickup optical system, a stationary member configured to movably support the moving member within the plane orthogonal to the optical axis of the image pickup optical system, and a plurality of drive means configured to drive the moving member so as to move within the plane orthogonal to the optical axis of the image pickup optical system with respect to the stationary member, in which first drive means of the plurality of drive means is arranged on a first surface side of the moving member and second drive means of the plurality of drive means is arranged on a second surface side of the moving member.

Benefits of the invention will become more apparent from the following detailed description.

DETAILED DESCRIPTION OF THE PREFERRED EMBODIMENT

Hereinafter, the present invention will be described according to an embodiment illustrated in the accompanying drawings. The respective drawings used for the following description are intended for schematic illustration, and respective components may be shown in different dimensional relationships and scales among respective members, varying from one component to another so that the respective components are shown in sizes they are recognizable on the drawings. Therefore, the present invention is not limited to only the illustrated modes with regard to quantities of the components, shapes of the components, size ratios among the components and relative positional relationships among the respective components described in the respective drawings.

Figure 1:
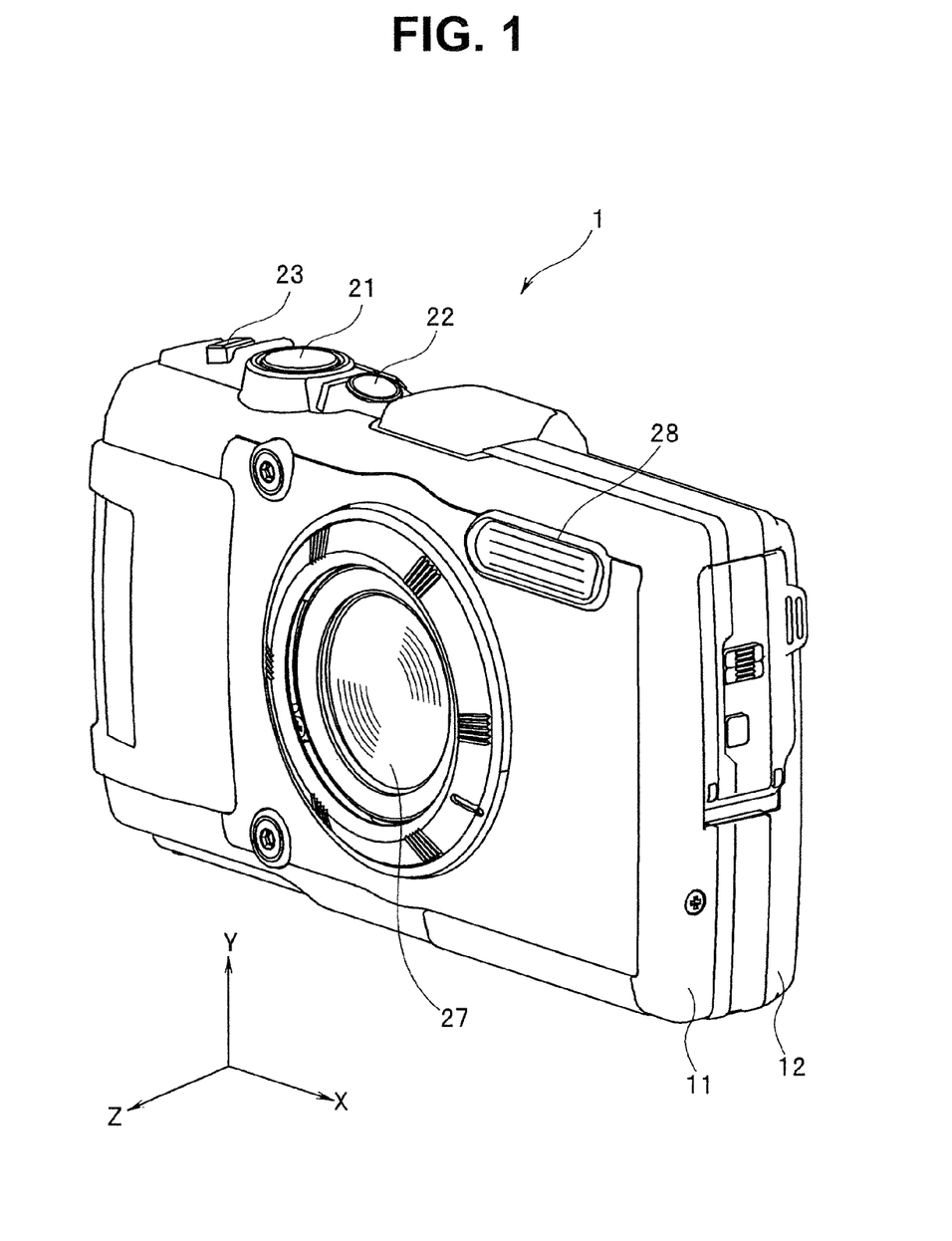
FIG. 1 is an external perspective view illustrating an image pickup apparatus to which an image stabilization apparatus according to an embodiment of the present invention is applied.
Figure 2:
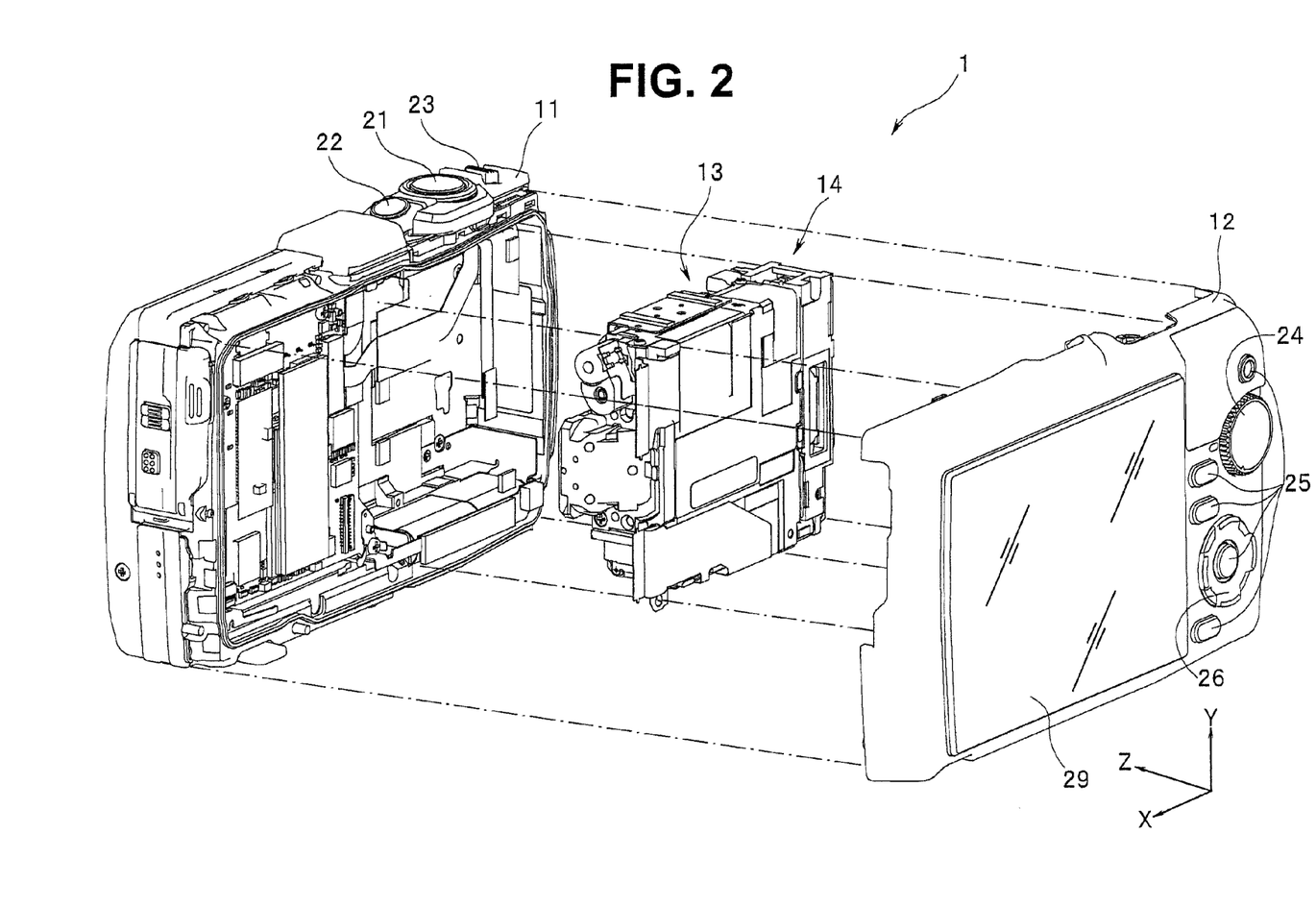
FIG. 2 is an exploded perspective view of the image pickup apparatus shown in FIG. 1.
Figure 3:
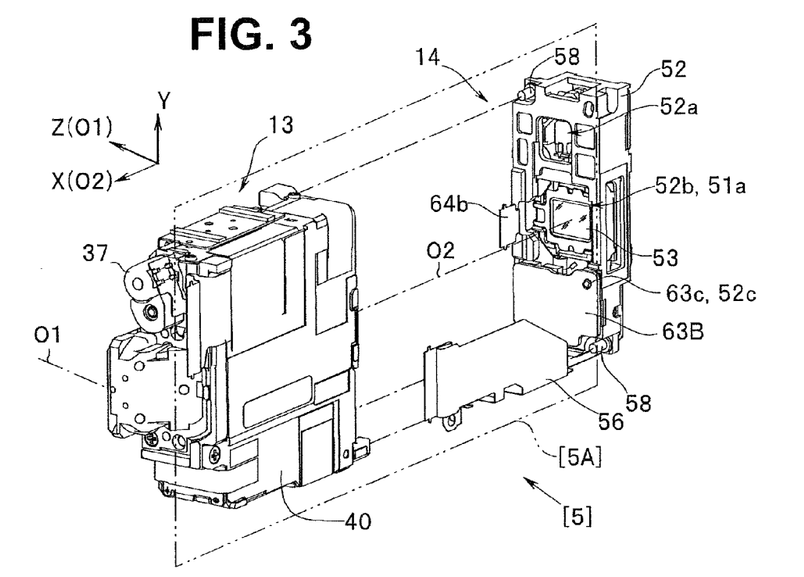
FIG. 3 is an exploded perspective view of main parts mainly illustrating a rear side of a configuration unit extracted as part of a configuration unit constituting the image pickup apparatus shown in FIG. 1 (a configuration unit (lens unit) including the image pickup optical system and the image stabilization apparatus)
Figure 4:
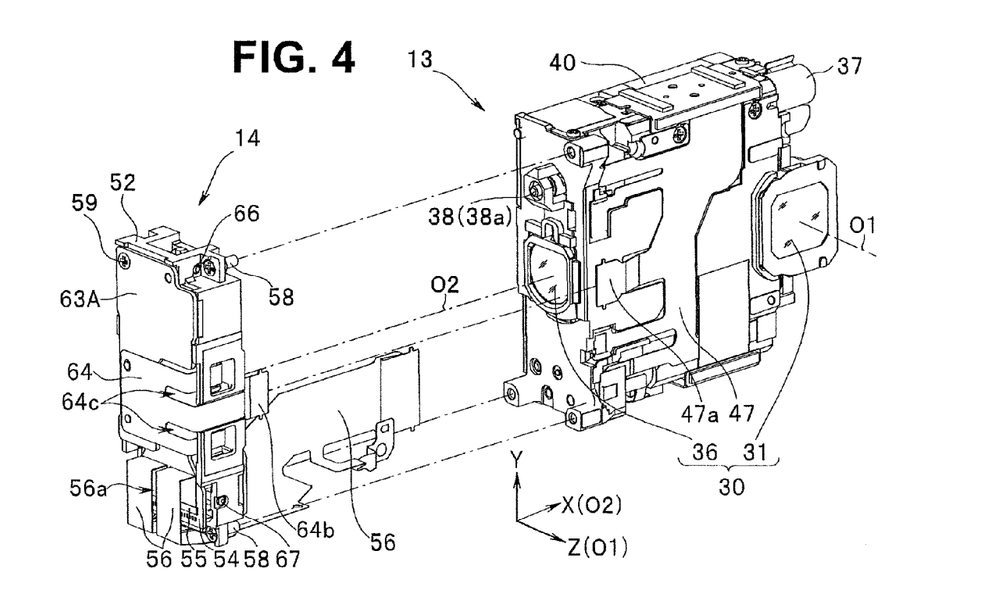
FIG. 4 is an exploded perspective view of main parts illustrating mainly a front side in FIG. 3.
Figure 5:
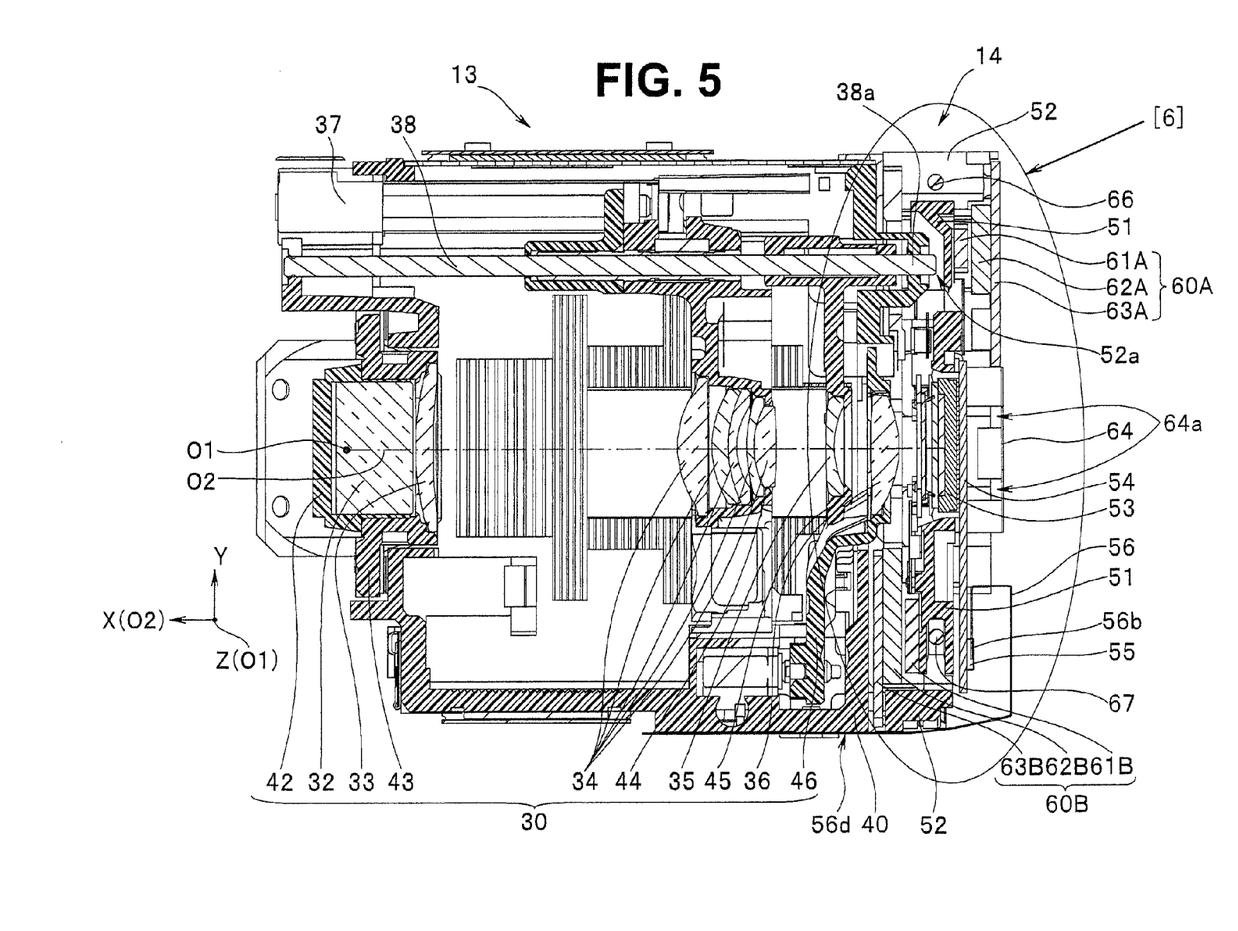
FIG. 5 is an enlarged cross-sectional view of the unit assembled by coupling the lens unit and the image stabilization apparatus shown in FIG. 3, cut along a cutting surface shown by reference numeral [5A] in FIG. 3 and seen from a direction indicated by an arrow [5] in FIG. 3.
Figure 6:
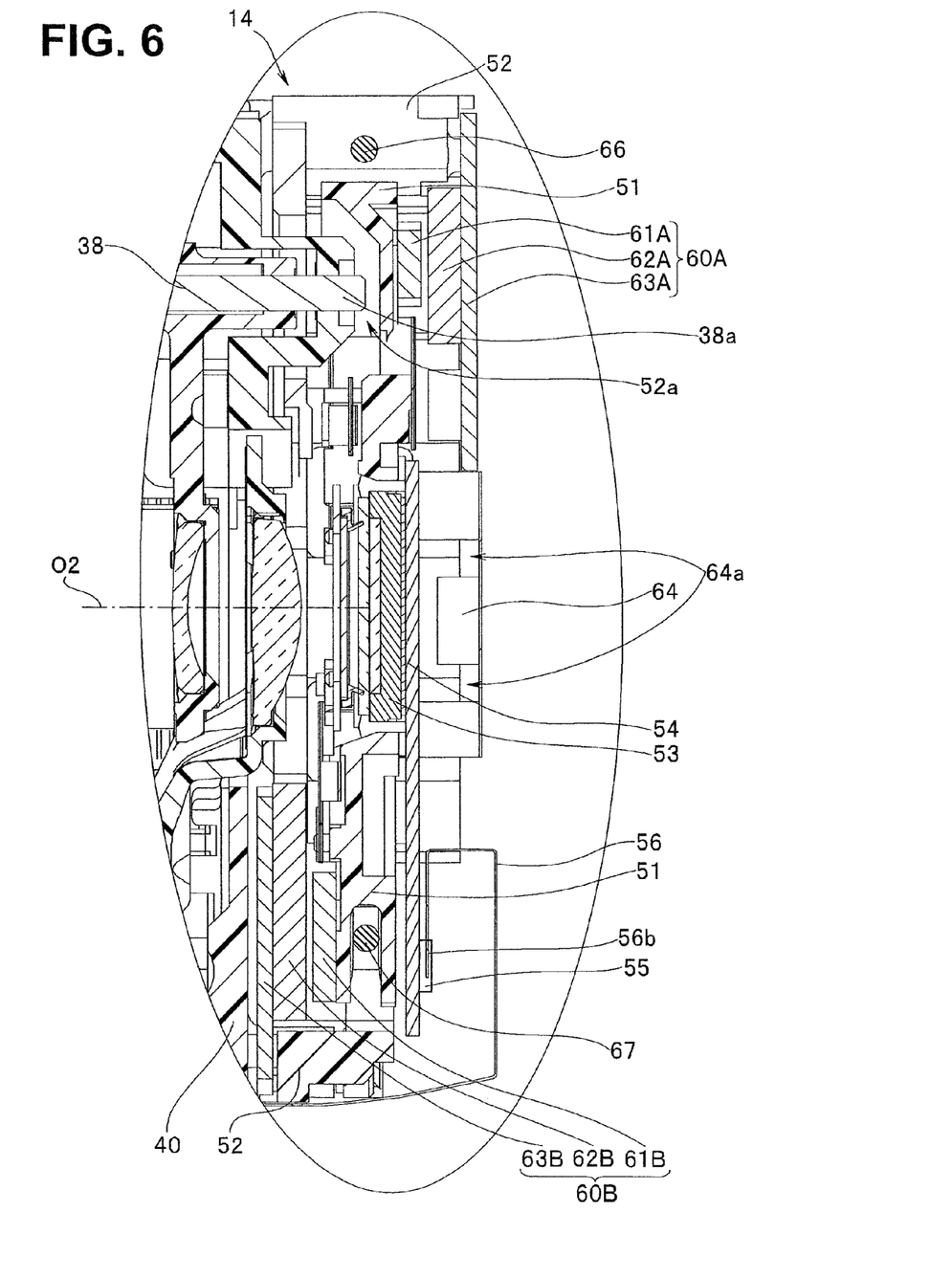
FIG. 6 is an enlarged cross-sectional view of main parts showing an enlarged view of a region shown by reference numeral [6] in FIG. 5.
Figure 7:
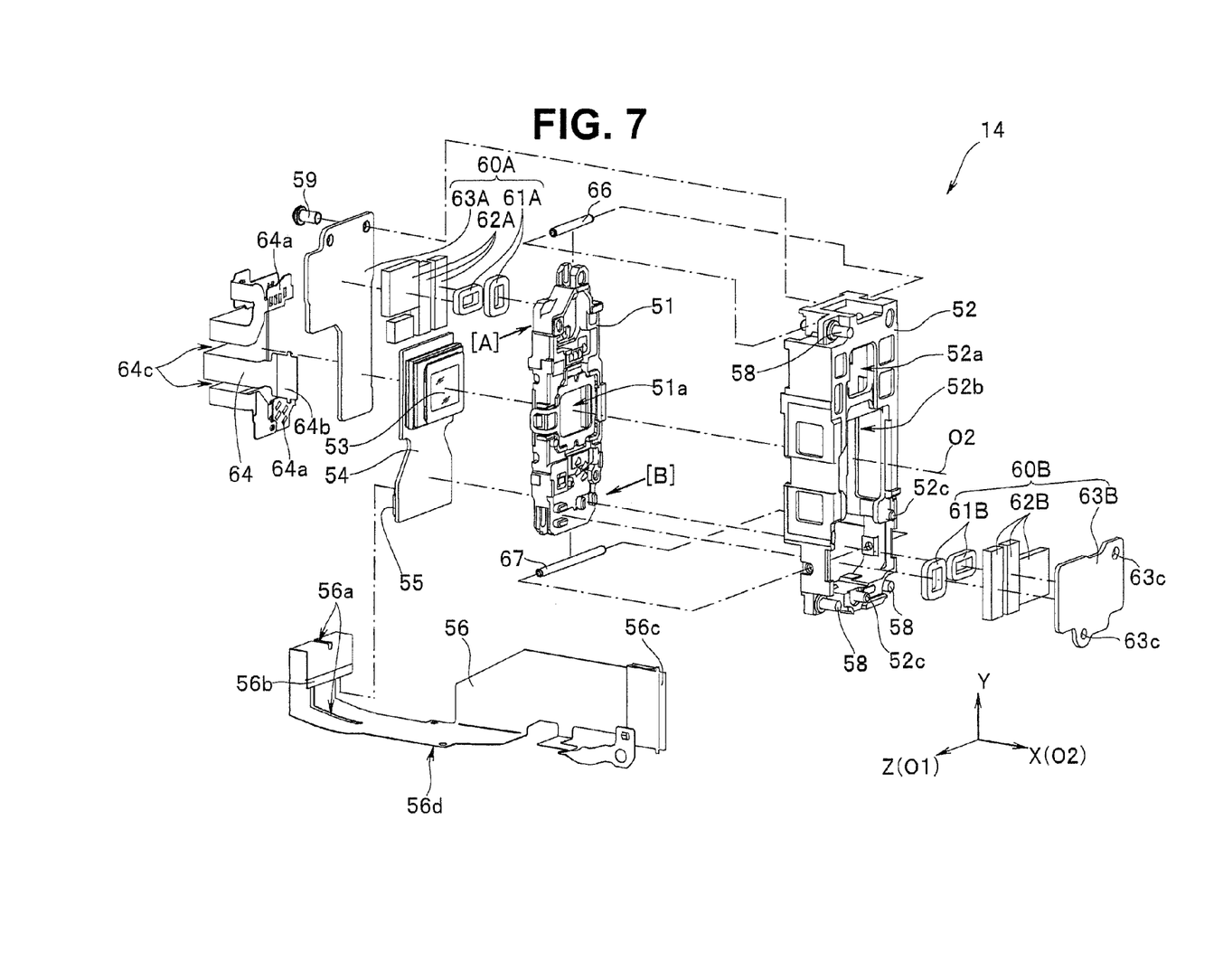
FIG. 7 is an exploded perspective view obtained by taking to pieces, the image stabilization apparatus according to the present embodiment which is applied to the image pickup apparatus shown in FIG. 1.

FIG. 1 and FIG. 2 are diagrams illustrating an image pickup apparatus to which an image stabilization apparatus according to an embodiment of the present invention is applied. FIG. 1 is an external perspective view of the image pickup apparatus. FIG. 2 is an exploded perspective view of the image pickup apparatus shown in FIG. 1. FIG. 3 and FIG. 4 are exploded perspective views of main parts of a configuration unit extracted as part of a configuration unit constituting the image pickup apparatus shown in FIG. 1 (a configuration unit (lens unit) including an image pickup optical system and the image stabilization apparatus). FIG. 3 is a diagram illustrating mainly a rear side of the configuration unit (lens unit) including the image pickup optical system and the image stabilization apparatus. FIG. 4 is a diagram illustrating mainly a front side of the configuration unit (lens unit) including the image pickup optical system and the image stabilization apparatus. FIG. 5 is a cross-sectional view of the unit assembled by coupling the lens unit and the image stabilization apparatus shown in FIG. 3, cut along a cutting surface shown by reference numeral [5A] in FIG. 3 and seen from a direction shown by an arrow [5] in FIG. 3. FIG. 6 is an enlarged cross-sectional view of main parts showing an enlarged view of a region shown by reference numeral [6] in FIG. 5. FIG. 7 is an exploded perspective view obtained by taking to pieces, the image stabilization apparatus according to the present embodiment.

The image pickup apparatus to which the image stabilization apparatus of the present embodiment is applied is configured to sequentially photoelectrically convert optical images formed by, for example, an image pickup optical system using a photoelectric conversion device (hereinafter referred to as "image pickup device") such as a CCD (charge coupled device) image sensor or a CMOS (complementary metal oxide semiconductor) type image sensor, record an image signal thereby obtained in a storage medium as image data in a predetermined format (e.g., digital image data representing still image or movie) and include an image display apparatus configured to reproduce or display a still image or movie based on the digital image data recorded in the storage medium such as a liquid crystal display (LCD) or organic electro-luminescence (OEL) display, which will be described by taking a device called a "digital camera" or a "video camera" as an example.

Furthermore, the image pickup apparatus illustrated in the present embodiment adopts an image pickup optical system, a so-called folding optical system, bending optical system, optical path reflection type optical system in a mode configured to enter a light flux from an object, bend an optical axis (see a first optical axis O1) of an optical path of the light flux toward a direction along a second optical axis O2 orthogonal to the first optical axis O1 inside the apparatus using a reflected optical member and guide the light flux to an image pickup plane (light receiving plane) of an image pickup device located on the second optical axis O2.

Note that an X-axis shown in the drawings represents an axis in a horizontal direction when the image pickup apparatus 1 is seen from a front, and a Y-axis represents an axis orthogonal to the X-axis, that is, representing an axis in a vertical direction when the image pickup apparatus 1 is seen from the front. A Z-axis represents an axis in a direction that coincides with the first optical axis O1.

In the following description, a surface opposite to an object when the image pickup apparatus is used is assumed to be called a "front surface." A surface facing a user when the image pickup apparatus is used is assumed to be called a "rear surface." A surface on which a shutter release button among operation members is disposed is assumed to be called a "top surface." A surface opposite to the top surface is assumed to be called a "bottom surface." Furthermore, surfaces disposed on both sides when the image pickup apparatus is normally used are assumed to be called a "left side surface" and a "right side surface." The left and right in this case are distinguished as follows: the left side and the right side when the front surface of the image pickup apparatus is seen from the object side are defined as "left" and "right" respectively.

Furthermore, in the present embodiment, in a direction along the first optical axis O1 of the image pickup optical system, the side on which the object facing the front surface of the image pickup apparatus 1 is located is assumed to be called "front" and the side facing the rear surface of the image pickup apparatus 1 is assumed to be called "back."

First, a schematic configuration of an image pickup apparatus to which the image stabilization apparatus according to an embodiment of the present invention is applied will be described below.

The image pickup apparatus 1 illustrated in the present embodiment is constructed of an exterior casing formed of a front surface cover 11 and a rear surface cover 12 which are exterior members and various configuration units housed inside the exterior casing such as a lens unit 13 which is a configuration unit including an image pickup optical system 30 (see FIG. 5) and an image stabilization apparatus 14 (see FIG. 2 to FIG. 7; details will be described later) and additionally a flash light emitting apparatus, a power supply unit, a recording medium unit, an interface unit, a GPS (global positioning system) unit, a wireless communication unit, a display apparatus or the like. Note that since a basic configuration of the image pickup apparatus 1 itself has a configuration substantially the same as that of a conventional image pickup apparatus provided with a bending optical system, detailed description of the various configuration units will be omitted.

A plurality of operation members such as a shutter release button 21, a power supply button 22 and a zoom lever 23 are disposed on the top surface of the image pickup apparatus 1.

A front surface protective cover 27 and a light-emitting section 28 of the flash light emitting apparatus or the like are disposed on the front surface of the image pickup apparatus 1.

The front surface protective cover 27 is a transparent flat plate protective member provided so as to cover an opening portion formed in a substantially central part of the front surface cover 11 to take in an incident light flux into the image pickup optical system 30 which will be described later and configured to cover and protect the front surface of the image pickup optical system 30 provided inside the opening portion.

A display panel 29 of the display apparatus, a plurality of operation members such as a rotation dial type operation member 24, a (plurality of) push-button type operation members 25, and a four-direction selection operation member 26 are disposed on the rear surface of the image pickup apparatus 1. More specifically, a movie button (moving image pickup operation member), a display information switching button, a playback button, a menu button, a determination button or the like, and in addition, a mode dial, a cross button correspond to the operation members.

The lens unit 13 is a configuration unit constructed of a body base member 40, an image pickup optical system 30 made up of a plurality of optical lenses (31, 32, 33, 34, 35 and 36; see FIG. 4 and FIG. 5), a plurality of holding members (42, 43, 44, 45 and 46; see FIG. 4 and FIG. 5) configured to respectively hold a plurality of optical lenses constituting the image pickup optical system 30, a drive source 37 configured to move part of the plurality of optical lenses making up the image pickup optical system 30 forward or backward in a direction along the second optical axis O2 for an auto focus (AF) operation or a zoom operation and a lens drive mechanism including a lens drive shaft 38 or the like. Note that the above lens drive shaft 38 is disposed parallel to the second optical axis O2 in the vicinity of an edge on one side of the lens unit 13. One end of the lens drive shaft 38 is disposed so as to slightly protrude from one end portion of the lens unit 13 toward the second optical axis O2 direction (protruding region 38a).

Here, a detailed configuration of the image stabilization apparatus 14 according to the present embodiment will be described below using mainly FIG. 3 to FIG. 7.

The image stabilization apparatus 14 of the present embodiment is a so-called sensor shift type image stabilization apparatus configured to perform image stabilization by moving an image pickup plane of an image pickup device 53 (which will be described later) within a plane orthogonal to the optical axis (second optical axis O2).

The image stabilization apparatus 14 of the present embodiment is mainly constructed of a moving member 51, a base 52 which is a stationary member, an image pickup substrate 54 on which the image pickup device 53 is mounted, and a plurality of (in the present embodiment, a pair of) image stabilization drive sections 60A and 60B which are a plurality of drive means or the like.

The moving member 51 is a component formed of two flat surfaces having a predetermined area. An image pickup substrate 54 is mounted on one surface of the moving member 51 and is configured to be able to move within a plane parallel to the image pickup plane of the image pickup device 53 with respect to the base 52 (within a YZ plane orthogonal to the second optical axis O2). For this reason, the moving member 51 is movably attached to the base 52 in a predetermined direction by guide shafts 66 and 67 fixed to the base 52. In this case, the moving member 51 is guided by the guide shafts 66 and 67 so as to be movable in a direction along the Z-axis and in a direction along the Y-axis, whereas the movement in a direction along the X-axis (direction along the second optical axis O2) is restricted.

The image pickup substrate 54 is fixed to the moving member 51 as described above. The image pickup device 53 is mounted o the image pickup substrate 54. The image pickup plane of the image pickup device 53 is disposed so as to be parallel to the YZ surface orthogonal to the second optical axis O2. Furthermore, an optical path opening 51a for exposing the image pickup plane of the image pickup device 53 is formed in the moving member 51. The image stabilization apparatus 14 is disposed inside the image pickup apparatus 1 so that the second optical axis O2 passes through substantially the center of the optical path opening 51a. The image pickup device 53 is disposed so that the image pickup plane is parallel to the plane orthogonal to the second optical axis O2 on the second optical axis O2. In such a case, the image pickup plane of the image pickup device 53 is disposed so as to be oriented toward the side on which the lens unit 13 is disposed. Thus, the incident light flux from the object in front of the image pickup apparatus 1 is configured to pass through the above lens unit 13 and reach the image pickup plane of the image pickup device 53. Note that in the following description, the one of the two planes of the moving member 51 facing the side on which the above lens unit 13 is disposed, that is, the plane on the side on which the image pickup device 53 is mounted is assumed to be called a "first plane." On the other hand, the plane of the side opposite to the above first plane of the same moving member 51 (rear surface side) is assumed to be called a "second plane."

A connection connector 55 is mounted on the image pickup substrate 54 on the plane opposite to the plane on which the image pickup device 53 is mounted (rear surface side; second plane). One end 56b of the image pickup flexible printed circuit board 56 (hereinafter abbreviated as "image pickup FPC 56") engages with and is connected to the connection connector 55. The above one end 56b of the image pickup FPC 56 is connected to the connection connector 55, extends from here, is fixed and disposed along the outer surface of the image stabilization apparatus 14 and the outer surface of the lens unit 13 and another end 56c is connected to a predetermined circuit section (not shown). Note that since a connection destination of the other end 56c is not particularly related to the present invention, it is not shown.

The above image pickup FPC 56 is an electric substrate configured to constitute a signal transmission path to transmit a control signal for driving/controlling the above image pickup device 53 or an image signal or the like acquired by the above image pickup device 53 to the predetermined circuit section (not shown) of the image pickup apparatus 1.

The above image pickup FPC 56 is configured such that the one end 56b is connected to the connection connector 55 of the image pickup substrate 54 as described above. In this case, the image pickup substrate 54 is fixed to the moving member 51. The moving member 51 is configured to be movable in a predetermined direction with respect to the base 52 which is a stationary member. On the other hand, the image pickup FPC 56 is fixed to the respective outer surfaces of the image stabilization apparatus 14 and the lens unit 13. Therefore, when the above connection connector 55 moves in a predetermined direction with the one end 56b of the above image pickup FPC 56 engaged with and connected to the above connection connector 55, the image pickup FPC 56 in the fixed state is also moved at the connection region with the connection connector 55, that is, at the one end 56b.

Therefore, it is necessary to allow the one end 56b of the above image pickup FPC 56 to move in the predetermined direction at the connection region between the above image pickup FPC 56 and the above connection connector 55. For this reason, a slit 56a is formed in the above image pickup FPC 56 in the vicinity of the one end 56b connected to the above connection connector 55.

Note that the one end 56b of the above image pickup FPC 56 is connected to the connection connector 55 and the image pickup FPC 56 is disposed in such a way as to extend from the connection region in a direction along the Y-axis, along the outer surface on the bottom surface side of the image stabilization apparatus 14 and further extend along the outer surface on one side face of the image stabilization apparatus 14 in a direction along the X-axis and further extend along the outer circumference of one side face of the lens unit 13. In this case, the image pickup FPC 56 is fixed with respect to one side face region of the lens unit 13 at a fixing region 56d (see FIG. 5 and FIG. 7) which is a predetermined region in the middle of the above image pickup FPC 56. Note that see FIG. 5 to FIG. 7 for routing of the above image pickup FPC 56.

Furthermore, some components (coils 61A and 61B) making up the plurality of (the pair of) image stabilization drive sections 60A and 60B are fixed to the moving member 51 (details will be described later).

The base 52 is a basic component section and a stationary member of the image stabilization apparatus 14. The base 52 is fixed to an end of the above lens unit 13 using a plurality of screws 58. In this way, the image stabilization apparatus 14 is coupled with and fixed to the lens unit 13.

The guide shafts 66 and 67 are fixed to the base 52 as described above and the above moving member 51 is attached so as to be movable within the YZ plane via the guide shafts 66 and 67. At this time, the above moving member 51 is disposed in a mode in which it is accommodated in an inner space of the above base 52.

An optical path opening 52b is formed at a predetermined position of the above base 52 facing the optical path opening 51a of the moving member 51 attached to the above base 52. A positional relationship of the base 52 inside the image pickup apparatus 1 is set such that the second optical axis O2 passes through substantially the center of the optical path opening 52b as well. Therefore, an incident light flux from the object is configured to reach the image pickup plane of the image pickup device 53 without hindrance.

Furthermore, a lens drive shaft retraction section 52a is formed in the base 52 to prevent the protruding region 38a at one end of the lens drive shaft 38 of the lens unit 13 from interfering with the image stabilization apparatus 14 when the lens unit 13 is coupled with the image stabilization apparatus 14.

Some components (magnets 62A and 62B, yokes 63A and 63B) making up the plurality of (the pair of) image stabilization drive sections 60A and 60B are fixed to the base 52 (details will be described later).

The above plurality of (the pair of) image stabilization drive sections 60A and 60B are drive means for moving the moving member 51 mounted with the image pickup substrate 54 with respect to the base 52 which is a stationary member in a direction along the image pickup plane of the image pickup device 53 within the YZ plane orthogonal to the second optical axis O2 by a predetermined amount at predetermined timing. Here, one (e.g., 60B) of the above pair of image stabilization drive sections 60A and 60B is assumed to be called "first drive means" and the other (e.g., 60A) is assumed to be called "second drive means."

The plurality of (the pair of) image stabilization drive sections 60A and 60 in the image stabilization apparatus 14 are constructed of the coils 61A and 61B, the magnets 62A and 62B, and the yokes 63A and 63B, which are disposed in regions facing each other across the image pickup device 53 (second optical axis O2) respectively and an image stabilization drive flexible printed circuit board 64 (hereinafter abbreviated as "image stabilization drive FPC 64") connected to the respective coils 61A and 61B, or the like.

The above coils 61A and 61B are configured as one set of two coils respectively. The coils 61A and the coils 61B are fixed at the respective regions facing each other across the optical path opening 51a of the moving member 51. In this case, the one set of coils 61B are disposed on the plane (first plane) facing the lens unit 13 on the above moving member 51 (see an arrow denoted by reference character [B] in FIG. 7). On the other hand, the other set of coils 61A are disposed on the plane (rear side; second plane) opposite to the plane facing the lens unit 13 on the above moving member 51 (see an arrow denoted by reference character [A] in FIG. 7). In other words, the coils 61B of the one first drive means (60B) which is one of the plurality of drive means (the pair of image stabilization drive sections 60A and 60B) are disposed on the first plane of the above moving member 51, and the coils 61A of the other second drive means (60A) of the plurality of drive means (the pair of image stabilization drive sections 60A and 60B) are disposed on the second plane of the above moving member 51.

The above magnets 62A and 62B are configured as one set of a plurality of magnets respectively. The above magnets 62A and 62B are disposed at regions facing the above respective coils 61A and 61B respectively. That is, the magnets 62B in the first drive means (60B) are disposed at the region facing the coil 61B on the first plane of the above moving member 51 and the magnets 62A in the second drive means (60A) are disposed at the region facing the coil 61A on the second plane of the above moving member 51.

Furthermore, the above yokes 63A and 63B are each formed of one flat plate magnetic body (e.g., metal plate member). The respective yokes 63A and 63B are disposed at regions facing the magnets 62A and 62B respectively. That is, the yoke 63B in the first drive means (60B) is disposed opposite to the magnet 62B disposed at a region facing the coil 61B on the first plane of the above moving member 51 and the yoke 63A in the second drive means (60A) is disposed opposite to the magnet 62A disposed at a region facing the coil 61A on the second plane of the above moving member 51.

In this case, the one yoke 63A is fixed to the rear surface side (surface opposite side to the surface facing the lens unit 13) of the above base 52 using a screw 59 (see FIG. 4). The above magnets 62A are fixed to the yoke 63A and the magnets 62A are disposed at a region facing the above coils 61A.

The other yoke 63B is fixed to the plane on the above base 52 side facing the lens unit 13. The yoke 63B is fixed based on, for example, the following configuration. As shown in FIG. 7, (two) through holes 63c are drilled in the yoke 63B. In correspondence with these holes, (two) boss portions 52c are provided so as to protrude on the base 52 side. The boss portions 52c of the base 52 are inserted into and disposed on the through holes 63c of the yoke 63B, and the yoke 63B is thereby positioned with respect to the base 52. In this condition, the image stabilization apparatus 14 is coupled with and fixed to the lens unit 13. Thus, the yoke 63B is fixed sandwiched between the base 52 of the image stabilization apparatus 14 and the body base member 40 of the lens unit 13. Note that the above magnets 62B are fixed to the plane of the above yoke 63B facing the above coil 61B.

One end 64a (see FIG. 7) of the image stabilization drive FPC 64 is connected to the above coils 61A and 61B (connection state is not shown). The image stabilization drive FPC 64 is an electric substrate that constitutes a signal transmission path for transmitting a control signal for driving/controlling the drive means (the pair of image stabilization drive sections 60A and 60B) in the image stabilization apparatus 14 from a predetermined circuit section (not shown) of the image pickup apparatus 1.

For that reason, the above image stabilization drive FPC 64 extends toward the bottom surface side of the image stabilization apparatus 14 more than the connection region with the above coils 61A and 61B, is folded back on the external plane on the bottom surface side of the image stabilization apparatus 14 as shown in FIG. 4, and then extends in a direction along the X-axis so as to follow the external plane on the front side of the image stabilization apparatus 14. A connection portion 64b provided at the other end of the image stabilization drive FPC 64 is connected to a connector 47a of a flexible printed circuit board 47 disposed on an outer circumference of the front of the lens unit 13. Here, the flexible printed circuit board 47 is connected to a predetermined circuit portion (not shown) of the image pickup apparatus 1. A control signal transmitted from the predetermined circuit portion of the image pickup apparatus 1 is configured to be transmitted to the pair of image stabilization drive sections 60A and 60B via the above flexible printed circuit board 47 and the image stabilization drive FPC 64.

Note that the above coils 61A and 61B to which the above image stabilization drive FPC 64 is connected are fixed to the moving member 51 as described above. Therefore, the above image stabilization drive FPC 64 is also provided with slits 64c to allow the connection region between the one end 64a and the coils 61A and 61B to move (see FIG. 4 or the like).

Note that in addition, the components and configuration units or the like other than the aforementioned configuration are assumed to include configurations substantially the same as those applicable to conventional image pickup apparatuses, and detailed description will therefore be omitted.

As described above, according to the above embodiment, in order to correct image blur whereby an optical image formed by an image pickup optical system becomes unstable on the image pickup plane of the image pickup device, a sensor shift type image stabilization apparatus provided with a configuration capable of moving the image pickup plane of the image pickup device within a plane orthogonal to the optical axis devises a layout of the respective components making up the drive means (the pair of image stabilization drive sections 60A and 60B) for moving the moving member 51 provided with the image pickup substrate 54 on which the image pickup device 53 is mounted, and can thereby implement a configuration capable of contributing to miniaturization of the apparatus.

That is, a mode in which the pair of image stabilization drive sections 60A and 60B which are drive means for performing image stabilization are disposed at respective regions facing each other across the image pickup device 53 (second optical axis O2) is configured by forming the lens drive shaft retraction section 52a for retracting the protruding region 38a of the lens drive shaft 38 of the lens unit 13 on the plane opposite to the protruding region 38a, providing the image stabilization drive section 60A (coils 61A, magnets 62A, yoke 63A) on the rear side of the lens drive shaft retraction section 52a, and providing the image stabilization drive sections 60B (coils 61B, magnets 62B, yoke 63B) at a region opposite side to the region at which the above image stabilization drive sections 60A is disposed across the above image pickup device 53 (second optical axis O2).

That is, the mode is configured in such a way that one (60A) of the pair of image stabilization drive sections 60A and 60B is provided on the plane (second plane) opposite side to the plane facing the lens unit 13 of the two flat planes of the moving member 51 and the other (60B) is provided on the plane (first plane) facing the lens unit 13 of the two planes of the moving member 51.

When the image stabilization apparatus 14 is coupled with the lens unit 13, adopting such a configuration makes it possible to prevent the protruding region 38a of the lens drive shaft 38 from the lens unit 13 from interfering with the image stabilization apparatus 14 and secure the necessary length of the lens drive shaft 38.

Furthermore, it is possible to prevent the moving member 51 from interfering with the base 52 (stationary member), secure a moving space in which the moving member 51 can move sufficiently, prevent enlargement in size of the apparatus in the second optical axis O2 direction, and further contribute to a size reduction of the apparatus itself.

In other words, by dispersively arranging the respective components of the pair of image stabilization drive sections 60A and 60B in a well-balanced manner, it is possible to secure enough space in which the connection region of the flexible printed circuit board (FPCs 56 and 64 or the like) connected to the moving member 51 moves and perform more stable image stabilization drive.

Note that the embodiment of the present invention has been described taking a case with a sensor shift type image stabilization apparatus as an example, and on the other hand, the present invention is likewise applicable to a lens shift type image stabilization apparatus as a mode of the image stabilization apparatus.

Although the present embodiment has illustrated an image stabilization apparatus applicable to a lens unit integrated image pickup apparatus provided with a bending optical system, the present invention is likewise applicable to a lens unit integrated image pickup apparatus that adopts a lens unit other than the bending optical system.

Furthermore, the present embodiment has illustrated a mode of a so-called moving coil in which of the components making up the plurality of drive means (the pair of image stabilization drive sections 60A and 60B) for driving the moving section for performing image stabilization, the coils 61A and 61B are fixed to the moving member 51 side and the magnets 62A and 62B, and the yokes 63A and 63B are fixed to the base 52 side which is a stationary member, but the present invention is not limited to the mode. For example, a so-called moving magnet type may be adopted in which the coils 61A and 61B in a plurality of drive means are fixed to the base 52 (stationary member) side, and the magnets 62A and 62B, and the yokes 63A and 63B are fixed to the moving member 51 side.

The present invention is not limited to the aforementioned embodiment and it goes without saying that various modifications and applications can be made without departing from the spirit and scope of the present invention. Furthermore, the above embodiment includes inventions in various stages and various kinds of invention can be extracted with an appropriate combination of a plurality of disclosed configuration requirements. For example, when several configuration requirements are deleted from all configuration requirements disclosed in the above embodiment, if the problems to be solved by the invention can be solved and advantageous effect of the invention can be achieved, the configuration from which the configuration requirements are deleted can be extracted as an invention. Moreover, components among different embodiments may be combined as appropriate. The invention is not restricted by any specific aspects except being limited by the appended claims.

The present invention is not limited to an image pickup apparatus specialized for an image pickup function alone, but can be widely applied to electronic devices of other modes provided with various image pickup functions such as digital cameras, movie cameras, mobile phones, smartphones, electronic notebooks, electronic dictionaries, portable information terminals, personal computers, tablet type terminals, game machines, television receivers, clocks, navigation devices using GPS (global positioning system).

In addition, the present invention is likewise applicable to electronic devices having a function of acquiring images using an image pickup device and displaying the acquired images using a display apparatus, for example, observation apparatuses such as telescopes, binoculars, monocles, microscopes. The present invention is also likewise applicable to image pickup apparatuses such as monitoring cameras and vehicle-mounted cameras in addition to industrial or medical observation devices such as endoscopes and microscopes.

What is claimed is:

1. An image stabilization apparatus comprising:
a moving member configured to be movable within a plane orthogonal to an optical axis of an image pickup optical system;
a stationary member configured to movably support the moving member within the plane orthogonal to the optical axis of the image pickup optical system; and
a plurality of drive means configured to drive the moving member so as to move within the plane orthogonal to the optical axis of the image pickup optical system with respect to the stationary member,
wherein first drive means of the plurality of drive means is arranged on a first surface side of the moving member and second drive means of the plurality of drive means is arranged on a second surface side of the moving member.

2. The image stabilization apparatus according to claim 1, wherein the moving member comprises an image pickup device.

3. The image stabilization apparatus according to claim 1, wherein the moving member comprises part of optical lenses of the image pickup optical system.

4. The image stabilization apparatus according to claim 1, wherein the image pickup optical system is a bending optical system configured to bend an optical path of a light flux along a first optical axis incident from an object toward a direction along a second optical axis orthogonal to the first optical axis and guide the light flux onto an image pickup plane of an image pickup device located on the second optical axis, and
the optical axis is the second optical axis.

5. The image stabilization apparatus according to claim 1, wherein the drive means comprises a coil, a magnet and a yoke.

6. The image stabilization apparatus according to claim 5, wherein the coil is fixed to the moving member and the magnet and the yoke are fixed to the stationary member.

7. The image stabilization apparatus according to claim 5, wherein the coil is fixed to the stationary member and the magnet and the yoke are fixed to the moving member.

8. An image pickup apparatus comprising:
a lens drive mechanism comprising:
an image pickup device configured to photoelectrically convert an optical image to an image signal;
an image pickup optical system comprising a plurality of optical lenses;
a plurality of lens holding barrels configured to respectively hold the plurality of optical lenses constituting the image pickup optical system;
a lens drive shaft configured to movably support part of the plurality of lens holding barrels in a direction along an optical axis of the image pickup optical system; and
a drive source configured to drive the lens drive shaft, and
the image stabilization apparatus according to claim 1.

9. An image pickup apparatus configured by applying the image stabilization apparatus according to claim 1.

10. An image pickup apparatus comprising:
a lens drive mechanism comprising:
an image pickup device configured to photoelectrically convert an optical image to an image signal;
an image pickup optical system comprising a plurality of optical lenses;
a plurality of lens holding barrels configured to respectively hold the plurality of optical lenses constituting the image pickup optical system;
a lens drive shaft configured to movably support part of the plurality of lens holding barrels in a direction along an optical axis of the image pickup optical system; and
a drive source configured to drive the lens drive shaft, and
an image stabilization apparatus comprising:
a moving member configured to be movable within a plane orthogonal to the optical axis of the image pickup optical system;
a stationary member configured to movably support the moving member within the plane orthogonal to the optical axis of the image pickup optical system; and
a plurality of drive means configured to drive the moving member so as to move within the plane orthogonal to the optical axis of the image pickup optical system with respect to the stationary member,
wherein first drive means of the plurality of drive means is arranged on a first surface side of the moving member and second drive means of the plurality of drive means is arranged on a second surface side of the moving member.

* * * * *